Nov. 19, 1968 H. A. N. HOLLAND 3,411,811
SWIVEL JOINT ADAPTER FOR CONDUITS CONTAINING MORTAR OR THE LIKE
Filed May 12, 1966

United States Patent Office 3,411,811
Patented Nov. 19, 1968

3,411,811
SWIVEL JOINT ADAPTER FOR CONDUITS CONTAINING MORTAR OR THE LIKE
Henry A. Nelson Holland, Ridgewood, N.J., assignor to Raymond International Inc., New York, N.Y., a corporation of New Jersey
Filed May 12, 1966, Ser. No. 549,684
3 Claims. (Cl. 285—94)

ABSTRACT OF THE DISCLOSURE

A swivel joint adapter which prevents mortar or the like from contaminating relatively moveable parts of the adapter by the provision of a duct which at one end is exposed to the pressure of the mortar passing therethrough, which contains a pressure transmittable generally viscous medium, and which has its opposite end connected to direct the medium into the space between the relatively moveable parts.

---

Figure 1:
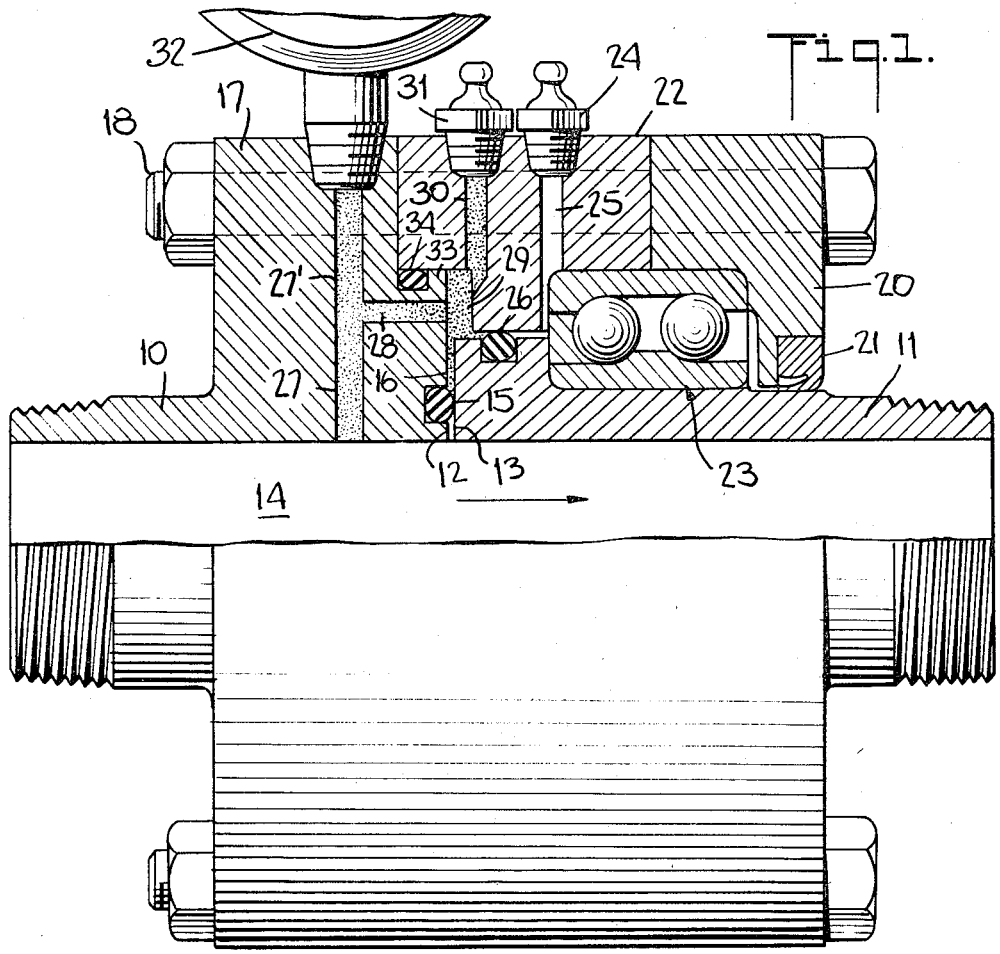

This invention relates to swivel joints for pipes or conduits and is more particularly adapted for use on such conduits carrying fluid or slurry materials under pressure and which have properties such as because of abrasiveness or otherwise, if same are permitted to enter between the sealing surfaces or areas of the swivel joint, they will cause excessive wear or deterioration of the relatively swiveling parts and thus promote leakage or failure of the sealing means.

One particular example of the various possible uses of the invention is for swivel joints of conduits carrying cement mortar. For various types of construction work, cement mortar must be conveyed from a suitable source and for some distance under fairly heavy pressure, and it is often important that the conduit be provided with a swiveling coupling in which the relatively movable sealing surfaces will tend to become abraded and worn away, thus permitting leakage at the seal if the mortar is allowed to enter between said surfaces.

In accordance with the present invention, this problem is overcome in a relatively simple and inexpensive way by providing in or in association with the swivelled coupling, a duct having an opening into, or a connection subject to the pressure of the fluid or slurry being conveyed, such duct also communicating with the relatively swiveling surfaces at the joint seal and preferably externally of the sealing means per se and the duct being filled with a suitable pressure transmitting material so that the pressure of the flowing fluid or slurry is applied to the sealing surfaces, thus opposing the fluid or slurry from penetrating in between such surfaces. Various pressure-transmitting mediums may be used in such duct, for example relatively thick or viscous grease, or any suitable known non-abrasive paste, or a plastic mass capable of transmitting the pressure or pressure variations, such media being hereinafter for convenience referred to generally as viscous.

In some cases, if desired, the duct containing the pressure-transmitting medium may have an opening into the conduit at a point further upstream than the swivel joint and where the pressure in the conduit may be slightly higher than at the joint. In this way the pressure-transmitting medium may be used to maintain a positive differential pressure on the swiveled sealing means.

In some cases it may be desirable to provide ball bearing means, or other anti-friction bearing means between the relatively swiveled parts of the joint and to maintain such bearing means lubricated with a lubricant other than pressure-transmitting medium in the duct above referred to. In such cases a seal may be provided at relatively swiveling surfaces to prevent the grease or other pressure-transmitting medium from entering the bearings, and the latter may be provided with independent and suitable lubricating facilities, thus keeping the grease or other pressure-transmitting medium out of the bearings and permitting them to be lubricated with a suitable light grade of oil or grease, if desired.

With one modification of the invention, the fluid-transmitting medium may be separated from the lubricating medium for the bearings by a pair of sealing means with a vent to the outside atmosphere located therebetween so that if any of the fluid-transmitting medium (such as grease) should escape past the first of such seals, it will be vented and prevented by the second of such pair of seals from entering the bearing region. This is particularly desirable to prevent any of the pressure-transmitting medium, if same should become contaminated, from entering into and injuring such bearings.

In order to make possible the monitoring of the pressure of the pressure-transmitting medium in the aforesaid duct, a pressure gauge, if desired, may be connected to such duct at a suitable point so as to make possible the giving of an indication, for example, in case the channel in the duct should become blocked or if the pressure therein shall for any reason become too low.

Various further and more specific objects, features and advantages of the invention will appear from the description given below, taken in connection with the accompanying drawings, illustrating by way of example preferred forms of the invention.

Figures 2, 3:
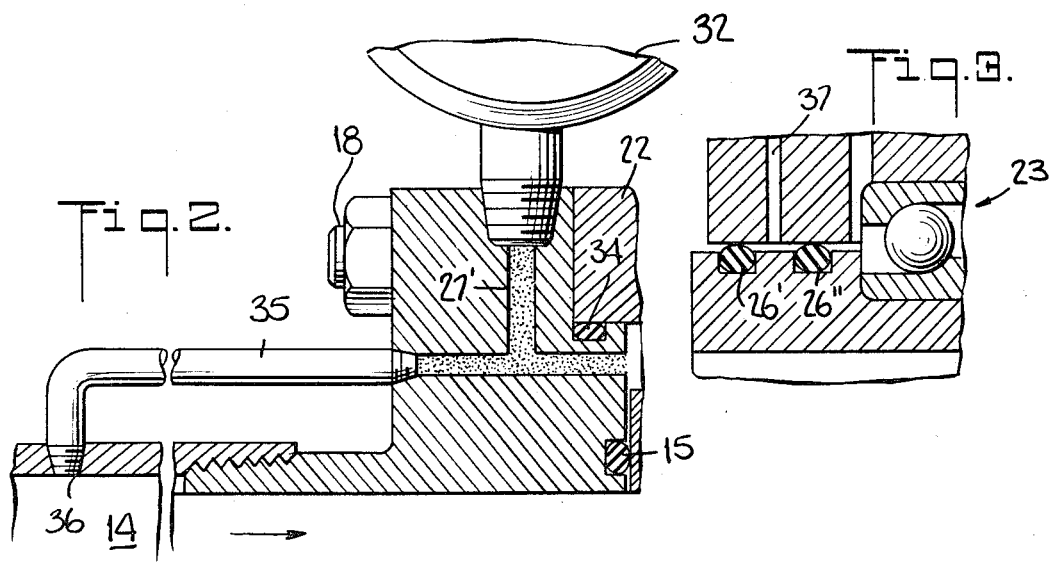

In the drawings:

FIG. 1 is an elevational view, partly in section, showing a preferred form of the joint involving the invention; and FIGS. 2 and 3 are broken sectional views showing respectively alternative embodiments of the invention.

A joint as shown in FIG. 1 comprises a coupling member 10 adapted to be applied to one end of a conduit as by a threaded connection, and another member 11 adapted to be applied to the end of another conduit section, also by threaded engagement or otherwise. The members 10 and 11 have meeting and relatively swiveling surface areas, as at 12 and 13, which, of course, extend annularly about the space 14 within the coupling and through which the fluid, slurry or other material is adapted to flow from one conduit section to the other. Suitable sealing means may be provided between the faces 12 and 13 in the form, for example, of an annular O-ring 15 for sealing the space within the joint from access to the space or crevice 16 which extends annularly about the O-ring. The member 10 may have a flange portion 17 adapted to be secured by several bolts, as at 18, 19, to a flanged ring-like member 20 encircling the member 11 and with preferably a suitable annular packing means 21 therebetween. A ring-like member 22 is interposed between the portions 17 and 20 and there held in place by the bolts.

A ball bearing race assembly of suitable known construction is indicated at 23, encircling the member 11 and embraced by the members 20 and 22. A suitable lubricant may be introduced through coupling means 24 to a cavity 25 to lubricate the ball bearings. A suitable annular O-ring or other sealing means is provided at 26, extending around internally of the annular member 22 to seal off the region of the ball bearings.

A duct 27 opening into the space 14 is provided for receiving the hereinabove-described pressure-transmitting medium, this duct communicating preferably through several branches, one of which is shown at 28, to an annular cavity 29, so that the pressure-transmiting medium with which the cavities 27, 28 and 29 are filled, will serve to transmit the pressure from the space 14 around to the space 16 and as far as the sealing rings 15 and 26. A cavity 30 may extend from the space 29 to a suitable coupling means 31 through which the presure-transmitting medium may be introduced and replenished to fill the spaces and ducts for containing same.

The duct 27 may be extended, as at 27′, to communicate with a suitable pressure-indicating gauge 32, to enable monitoring of the pressure of the pressure-transmitting medium to determine, for example, when the ducts containing same may become clogged, or if for any reason the pressure within same should become abnormally low or lower than that of the medium flowing through the space 14.

The ring-like member 22 may be sealed with respect to a flange 33 on member 17, as by an O-ring 34.

With the arrangement as thus described, it will be apparent that, whatever may be the pressure within the space 14 within normal limits, such pressure will be applied to the pressure-transmitting medium in the ducts and cavities 27, 28, 29 and 16, with the result that the sealing means 15 is backed up by pressure substantially the same as that of the medium being conducted through the conduits and thus the latter medium is kept from escaping past the sealing means 15, and such sealing means and the surfaces at 16 are thus protected against abrasion or deterioration. Also, as desired, the pressure of this pressure-transmiting medium may be checked by the gauge and additional pressure-transmitting medium may be introduced, if necessary from time to time, through the coupling 31, independently of the introduction of lubricant through coupling 24 to the ball bearings.

With the embodiment as shown in FIG. 2, the construction may be the same as that above-described, except that here the duct containing the pressure-transmitting medium is extended as by a small pipe 35, which opens at 36 into the space 14, so as there to be subjected at an upstream location to slightly higher pressure than will occur at the region of the seal 15, thus further insuring that fluid flowing through the pipe will be prevented from passing seal 15 at any time.

With the embodiment shown in FIG. 3, the parts also are substantially the same as shown in FIG. 1, except that here the region containing the ball bearings 23 is protected by a pair of O-ring seals, as at 26′, 26″, against access by the pressure-transmitting medium, and a vent 37 to the atmosphere may be provided between these two seals, further to insure against leakage of any of the pressure-transmitting medium into the ball bearing region.

Although certain particular embodiments of the invention are herein disclosed for purposes of explanation, further modifications thereof, after study of this specification, will be apparent to those skilled in the art to which the invention pertains. Reference should accordingly be had to the appended claims in determinging the scope of the invention.

What is claimed and desired to be secured by Letters Patent is:

1. A swivel joint construction for conduits and the like adapted to contain fluid, semi-fluid and slurry material under pressure and of a character to cause wear or deterioration if same penetrates between areas of contact of the joint, said joint comprising a first bell-like member having an internal axial conduit, a second spigot-like member having an internal axial conduit aligned with said first conduit, a radially extending wall in said bell-like member, a radially extending flange on said spigot-like member, said flange being axially spaced from said wall to provide a passage therebetween in fluid communication with said material in said conduits, ring-like sealing means disposed in said radially extending passage and in fluid sealing relationship with the walls thereof, said bell-like member having an axially extending member joined to said radial wall radially outwardly thereof and disposed over an axially extending face of said flange member and in spaced relation thereto to form a second, axially extending passage in fluid communication with said first passage, ring-like sealing means disposed in said annular longitudinally extending passage, and in sealing relationship with the walls thereof, means defining an annular cavity in said bell-like member adjacent said radially extending passage and adjacent said annular longitudinally extending passage, and in fluid communication with each of said passages, said bell-like member having means forming a radially outwardy extending supply passage communicating with said cavity, coupling means in communication with said supply passage, said coupling means being adapted to receive a generally viscose medium under pressure, means defining a duct, one end of said duct being directly open to the interior of said conduit at a point upstream from the joint, the other end of said duct passing through said bell-like member and being connected to said annular cavity, said annular cavity being adapted to receive said medium under pressure from said supply passage, said duct and said radially extending and said annular longitudinally extending passages being adapted to receive said medium under pressure from said annular cavity, bearing means disposed between said bell-like member and said spigot-like member adjacent said radially extending flange, and means to retain said two members in rotary, assembled relation.

2. A joint construction in accordance with claim 1 further comprising pressure gauge means connected to said duct for monitoring the pressure of said medium therein.

3. A joint construction in accordance with claim 1 further comprising means for introducing lubricant to said bearing means, and sealing means interposed between said bell-like member and said spigot-like member adjacent said bearing means for retaining said lubricant in said bearing means.

References Cited

UNITED STATES PATENTS

| | | | |
|---|---|---|---|
| 1,518,368 | 12/1924 | Steed | 285—106 X |
| 1,912,494 | 6/1933 | Patterson | 285—98 |
| 2,323,179 | 6/1943 | Hall et al. | 285—96 X |
| 2,379,547 | 7/1945 | Sperry | 285—11 |
| 2,444,868 | 7/1948 | Allen et al. | 285—96 X |
| 2,485,497 | 10/1949 | Lemley et al. | 285—96 |
| 2,810,592 | 10/1957 | Williams | 285—106 X |
| 2,906,548 | 9/1959 | Faccou | 285—98 X |
| 2,922,664 | 1/1960 | Risley et al. | 285—106 X |
| 3,089,713 | 5/1963 | Scaramucci | 285—98 X |

FOREIGN PATENTS 1,310,665  10/1962  France.

CARL W. TOMLIN, *Primary Examiner.*

WAYNE L. SHEDD, *Assistant Examiner.*